United States Patent
Sylvan et al.

(10) Patent No.: US 9,239,460 B2
(45) Date of Patent: Jan. 19, 2016

(54) CALIBRATION OF EYE LOCATION

(71) Applicant: MICROSOFT TECHNOLOGY LICENSING, LLC, Redmond, WA (US)

(72) Inventors: Roger Sebastian Sylvan, Seattle, WA (US); Adam Poulos, Sammamish, WA (US); Michael Scavezze, Bellevue, WA (US); Stephen Latta, Seattle, WA (US); Arthur Tomlin, Kirkland, WA (US); Brian Mount, Seattle, WA (US); Aaron Krauss, Snoqualmie, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 239 days.

(21) Appl. No.: 13/892,142

(22) Filed: May 10, 2013

(65) Prior Publication Data

US 2014/0333665 A1    Nov. 13, 2014

(51) Int. Cl.
G09G 5/00     (2006.01)
G02B 27/01    (2006.01)
G06F 3/01     (2006.01)
G02B 7/12     (2006.01)

(52) U.S. Cl.
CPC .............. *G02B 27/0149* (2013.01); *G02B 7/12* (2013.01); *G02B 27/0172* (2013.01); *G02B 27/0189* (2013.01); *G06F 3/013* (2013.01); *G02B 2027/0198* (2013.01)

(58) Field of Classification Search
CPC .................................................... G06T 19/006
USPC .......................................................... 345/7, 8
See application file for complete search history.

(56) References Cited

U.S. PATENT DOCUMENTS

| 6,753,828 | B2 | 6/2004 | Tuceryan et al. | |
|---|---|---|---|---|
| 7,190,331 | B2 | 3/2007 | Genc et al. | |
| 7,986,816 | B1 | 7/2011 | Hoanca et al. | |
| 8,510,166 | B2 | 8/2013 | Neven | |
| 9,001,006 | B2 * | 4/2015 | Yu et al. | 345/7 |
| 2002/0113756 | A1 * | 8/2002 | Tuceryan et al. | 345/8 |
| 2004/0061831 | A1 | 4/2004 | Aughey et al. | |

(Continued)

FOREIGN PATENT DOCUMENTS

EP       0933720 A2    8/1999
WO    2014030017 A1    2/2014

OTHER PUBLICATIONS

ISA European Patent Office, International Search Report & Written Opinion for PCT/US2014/037411, WIPO, Sep. 17, 2014, 16 Pages.
Fuhrmann et al., "Fast Calibration for Augmented Reality," in Proceedings of the ACM symposium on Virtual reality software and technology, Dec. 20, 1999, 8 Pages.
Owen, et al., "Display Relative Calibration for Optical See-Through Head-Mounted Displays", in Third IEEE and ACM International Symposium on Mixed and Augmented Reality, Nov. 5, 2004, 9 pages.

(Continued)

*Primary Examiner* — Ryan R Yang
(74) *Attorney, Agent, or Firm* — Dan Choi; Judy Yee; Micky Minhas (57) ABSTRACT

Embodiments are disclosed that relate to calibrating a predetermined eye location in a head-mounted display. For example, in one disclosed embodiment a method includes displaying a virtual marker visually alignable with a real world target at an alignment condition. At the alignment condition, image data is acquired to determine a location of the real world target. From the image data, an estimated eye location relative to a location of the head-mounted display is determined. Based upon the estimated eye location, the predetermined eye location is then calibrated.

20 Claims, 4 Drawing Sheets

(56) References Cited

U.S. PATENT DOCUMENTS

| | | |
|---|---|---|
| 2006/0152434 A1* | 7/2006 | Sauer et al. ............... 345/8 |
| 2007/0273610 A1 | 11/2007 | Baillot |
| 2008/0106489 A1 | 5/2008 | Brown et al. |
| 2010/0091377 A1 | 4/2010 | Hedges et al. |
| 2011/0018903 A1 | 1/2011 | Lapstun et al. |
| 2012/0092328 A1 | 4/2012 | Flaks et al. |
| 2012/0212399 A1 | 8/2012 | Border et al. |
| 2012/0287040 A1 | 11/2012 | Moore et al. |
| 2012/0293395 A1 | 11/2012 | Williams |
| 2013/0007668 A1 | 1/2013 | Liu et al. |
| 2013/0050642 A1 | 2/2013 | Lewis et al. |
| 2013/0050833 A1 | 2/2013 | Lewis et al. |

OTHER PUBLICATIONS

Owen, et al., "Calibrating Head-Coupled Virtual Reality Systems", in a Thesis Submitted in Partial Fulfilment of the Requirements for the Degree of Master of Science in the Faculty of Graduate Studies, Apr. 2002, 106 pages.

IPEA European Patent Office, Written Opinion of the International Preliminary Examining Authority Issued in Application No. PCT/US2014/037411, Jul. 17, 2015, WIPO, 10 pages.

IPEA European Patent Office, International Preliminary Report on Patentability Issued in Application No. PCT/US2014/037411, Sep. 18, 2015, WIPO, 11 pages.

* cited by examiner

CALIBRATION OF EYE LOCATION

BACKGROUND

Near-eye display systems, such as head-mounted displays, present virtual content to the eyes of a user. To provide a realistic virtual image or hologram, the virtual content may be stereoscopically rendered from the point of view of each eye. To determine each eye's point of view, an estimated location of each of the user's eyes may be determined. In one example, the interpupillary distance (IPD) of the user and/or one or more assumptions regarding a location of the eyes relative to the display may be assumed or ascertained.

However, the use of an IPD to determine an estimated location of a user's eyes may pose various challenges. For example, depending upon the age, gender and other characteristics of a user, an IPD may range from 40 mm or less to 73 mm or more. Thus, using an assumed IPD introduces uncertainty into the accuracy of the corresponding estimated location. Further, directly measuring the IPD of a user typically involves an optical professional measuring the user's IPD using a millimeter ruler or a corneal reflex pupillometer. Visiting such a professional to acquire an IPD measurement may impose a significant inconvenience on a user of a near-eye display, as well as additional expense.

Additionally, it will be appreciated that an IPD value provides the distance between the pupils of each eye, without reference to each eye's location relative to the actual near-eye display. Thus, using solely an IPD value to estimate a user's eye location provides limited information with regard to each eye's actual location relative to the display.

SUMMARY

Various embodiments are disclosed herein that relate to calibrating a predetermined eye location in a head-mounted display. For example, one disclosed embodiment provides, in a head-mounted display, a method including displaying a virtual marker that is visually alignable with a real world target at an alignment condition and, at the alignment condition, acquiring image data to determine a location of the real world target. The method further includes, from the image data, determining an estimated eye location relative to a location of the head-mounted display. Based upon the estimated eye location, the predetermined eye location is calibrated.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
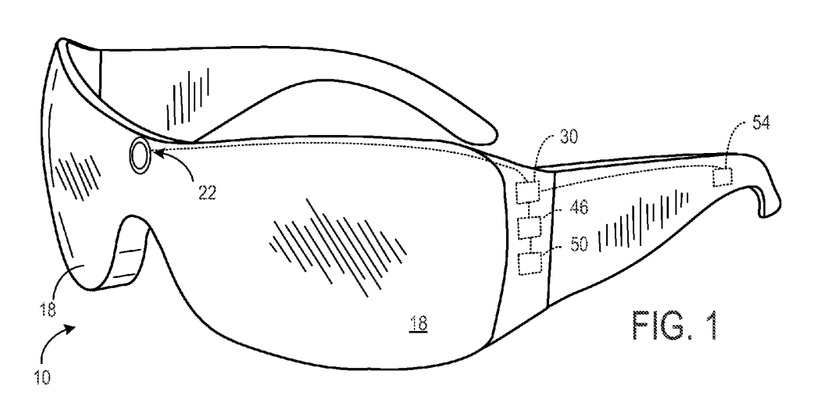
FIG. 1 shows an example embodiment of a head-mounted display.
Figure 2:
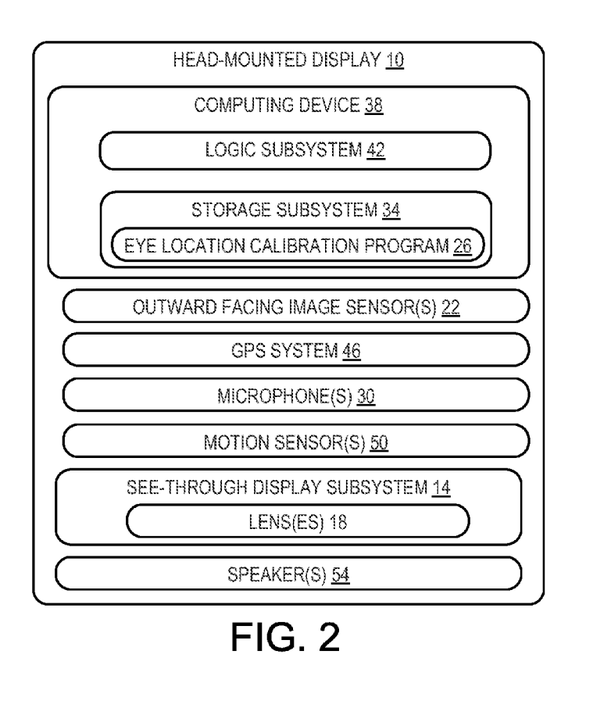
FIG. 2 shows a block diagram of the head-mounted display of FIG. 1.

As mentioned above, various types of near-eye displays may estimate the location of a user's eyes using a predetermined or measured IPD along with one or more other assumptions regarding the position of the eyes relative to the display. One example embodiment of a near-eye display is illustrated in FIGS. 1 and 2 as a wearable computing system in the form of a head-mounted display (HMD) 10. Using the HMD 10, a view of a real world scene through the HMD may be augmented with virtual images displayed via a see-through display subsystem 14.

The see-through display subsystem 14 may be configured to visually augment an appearance of a physical environment to a user viewing the physical environment through the HMD. For example, the appearance of the physical environment may be augmented by graphical content (e.g., one or more pixels each having a respective color and brightness) that is presented via the see-through display subsystem 14. The see-through display subsystem may display an image in any suitable manner. As one non-limiting example, the display subsystem 14 may include a light modulator on an edge of the lenses 18. In this example, the lenses 18 may serve as a light guide for delivering light from the light modulator to the eyes of a user. Such a light guide may enable a user to perceive a 3D virtual image located within the physical environment that the user is viewing, while also allowing the user to view physical objects in the physical environment.

HMD 10 further comprises a computing device 38 having a logic subsystem 42, a storage subsystem 34 in communication with the see-through display subsystem 14, and one or more sensors. The storage subsystem 34 comprises instructions stored thereon that are executable by logic subsystem 42, for example, to receive image data from outward facing image sensor(s) 22, location data from a GPS system 46, audio information from one or more microphone(s) 30, and motion data from one or more motion sensor(s) 50.

As mentioned above, calibrating a position of a user's eye relative to an HMD display may aid, for example, in the display of realistic stereoscopic images. Thus, to assist with such calibration, the HMD 10 may comprise instructions stored thereon that are executable to perform a calibration process in which a virtual marker is displayed that a user may align with a physical real world target by moving the user's head. When the virtual marker is aligned with the real world target ("alignment condition"), one or more outward facing image sensors 22 may acquire image data of the real world target, and an eye location calibration program 26 may determine a relative location of the real world target from the image data. Information regarding the real world target location combined with the known location of the virtual marker may allow the eye location calibration program 26 to determine an estimated eye location, and to use this location to calibrate a predetermined eye location.

The outward facing image sensors 22 may comprise any suitable type of image sensor or sensors. For example, outward facing image sensors 22 may include a depth camera, a visible light camera, an infrared light camera, and/or a position tracking camera. In some examples, outward facing image sensors 22 may include one or more optical sensors for observing visible spectrum and/or infrared light from real-world lighting conditions in the physical environment. Such sensors may include, for example, a charge coupled device image sensor and/or a CMOS sensor. It will be understood that outward facing image sensors 22 may have any suitable number and arrangement of light sources and image sensors.

It will be appreciated that, in some embodiments, the HMD 10 may not include eye-tracking or gaze-tracking capabilities or related sensor systems. Advantageously, and as described in more detail below, the disclosed embodiments may enable calibration of an eye location while avoiding the additional design complexity and associated costs of an eye-tracking or gaze-tracking system. It will also be appreciated that in other embodiments the HMD 10 may include eye-tracking or gaze-tracking systems that utilize, for example, one or more inward facing (i.e. user-facing) sensors.

HMD 10 further may include one or more microphones 30 configured to detect sounds, such as voice commands from a user. HMD 10 also may comprise a global positioning (GPS) system 46 to allow a location of HMD 10 to be determined. HMD 10 may further include one or more motion sensors 50 to detect movements of a user's head when the user is wearing HMD 10. The motion sensors 50 as well as the microphone(s) 30 may also be employed as user input devices, such that a user may interact with see-through display subsystem 14 and/or eye location calibration program 26 via gestures of the eye, neck and/or head, as well as via verbal commands. HMD 10 further may further include one or more speakers 54 configured to provide audio content to a user wearing the HMD.

It will be appreciated that the depicted HMD 10 is provided by way of example, and thus is not meant to be limiting. Therefore it is to be understood that the HMD 10 may include additional and/or alternative sensors, cameras, microphones, input devices, output devices, etc. than those shown without departing from the scope of this disclosure. Further, the physical configuration of an HMD and its various sensors and subcomponents may take a variety of different forms without departing from the scope of this disclosure.

It also will be understood that a computing system configured to calibrate an eye location in an HMD may take any suitable form other than integrated within HMD 10, including but not limited to a mainframe computer, server computer, desktop computer, laptop computer, tablet computer, home-entertainment computer, network computing device, gaming device, mobile computing device, mobile communication device (e.g., smart phone), other wearable computer, etc. Additionally, the methods and processes described above may be implemented as a computer-application program or service, an application-programming interface (API), a library, and/or other computer-program product.

Figure 3:
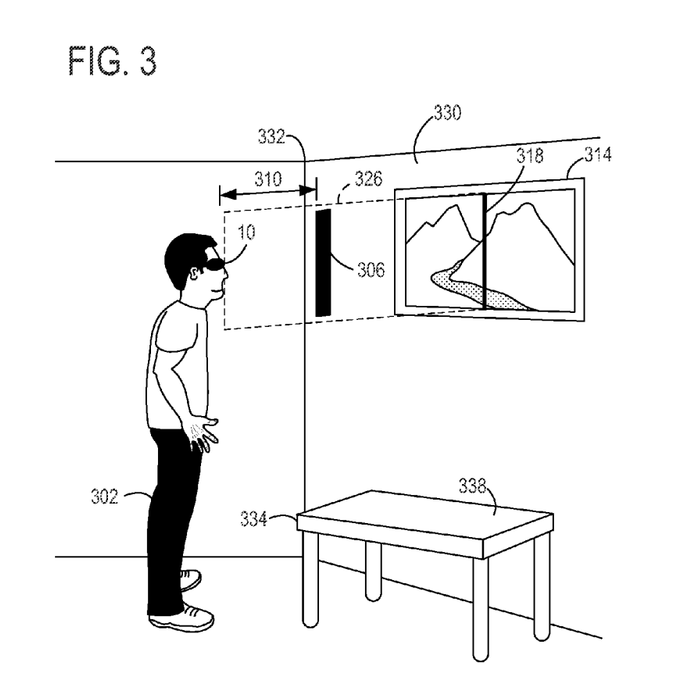
FIG. 3 shows a schematic diagram illustrating an example embodiment of a plane aligned with a real world target and a virtual marker displayed by the head-mounted display of FIG. 1.
Figure 4:
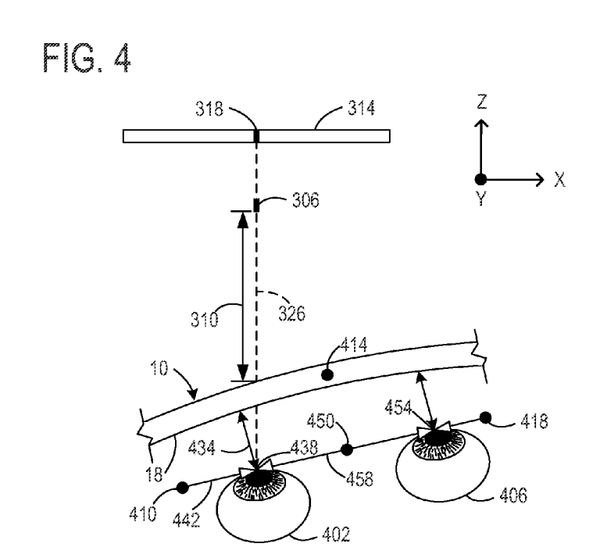
FIG. 4 shows a schematic top view of the schematic diagram of FIG. 3 illustrating the user's eyes in relation to the plane, target, virtual marker, and also a lens of the head-mounted display.

FIG. 3 shows an example use case in which a user 302 wears an HMD, such as HMD 10. FIG. 4 shows a schematic top view of the user's left eye 402 and right eye 406 in relation to a lens 18 of the HMD 10. It will be appreciated that FIGS. 3 and 4 are schematic illustrations in which distances, orientations, sizes and other parameters may be altered for descriptive purposes. In this example and for each of the left eye 402 and right eye 406 of user 302, the HMD 10 may access or calculate a predetermined eye location. For example, a left eye predetermined location 410 may be calculated relative to a fixed location 414 on the HMD 10. The left eye predetermined location 410 and fixed location 414 may be expressed in any suitable manner, such as via coordinates on an x-z axis or x-y-z axis. A right eye predetermined location 418 may be similarly accessed or calculated relative to fixed location 414.

In some examples the left eye predetermined location 410 and right eye predetermined location 418 may be estimated using one or more assumed distances, such as an IPD and/or a distance of an eye from the lens 18 of the HMD (e.g., an eye relief distance). In one example, an assumed IPD may be 65 mm and an assumed eye relief distance may be 20 mm. As the IPD is the sum of the individual distances from a center position between the eyes toward both eyes, in this example, the left eye predetermined location 410 and right eye predetermined location 418 may also be assumed to be equally offset from an estimated center 450, which may be based on fixed location 414. Thus, in this example both the left eye predetermined location 410 and right eye predetermined location 418 are assumed to be spaced from the estimated center 450 by 32.5 mm.

To calibrate one of the predetermined eye locations, the HMD 10 may display via the see-though display subsystem 14 a virtual marker 306 at an apparent distance 310 from the HMD 10 worn by user 302. As shown in the example shown in FIGS. 3 and 4, to the user 302 the virtual marker 306 in some embodiments may appear to float in space between the user and a poster 314 including a real world target 318 at which the user is gazing. The virtual marker 306 may be displayed to appear at any suitable distance from the HMD 10, and, may be displayed to appear either in front of or behind the real world target 318. In the example illustrated in FIGS. 3 and 4, the virtual marker 306 is displayed in the form of a vertical line (shown here with an exaggerated depth for ease of illustration). As described in more detail below, using a vertical line for the virtual marker 306 may enable a user to easily align the marker with a corresponding real world target having a linear component, such as a real world vertical line. Such a combination enables the user to easily detect when the two lines overlap, and to notice any tilting or other offset when the two lines are not aligned. Additionally and as discussed below, in other examples the virtual marker 306 may take other suitable forms and shapes including, but not limited to, an apparent point, a plurality of points, a cross shape, etc.

The virtual marker 306 may be displayed at a fixed location and distance 310 relative to HMD 10 such that, regardless of the user's movement or head location, the virtual marker 306 remains in this orientation relative to the HMD. Alternatively expressed and from the perspective of user 302, the virtual marker 306 is "tethered" to the HMD 10 such that it moves with the HMD. Accordingly and as described in more detail below, the user 302 may move his head and/or body to align the virtual marker 306 with the real world target 318 at an alignment condition. Additionally, it will be appreciated that because the virtual marker 306 is generated by the HMD 10, the fixed location of the virtual marker 306 relative to the HMD is known.

In the present example, the real world target 318 takes the form of a vertical line on the poster 314. In this example the vertical line has approximately the same width and length as the virtual marker 306. In other examples, the vertical line may be longer or shorter than the virtual marker 306. In still other examples, the real world target 318 may take other suitable forms and shapes including, but not limited to, a single point, a plurality of points, a cross shape, one or more dashed lines, a three-dimensional shape, etc. The real world target 318 may take the same form or shape as the virtual marker 306, or may take a different form or shape, such as a complimentary shape.

With the virtual marker 306 displayed, the user 302 closes either his left eye 402 or right eye 406, such that the user is viewing the virtual marker with only one eye. The user then follows the steps described below while viewing the virtual marker only with the one eye to calibrate the predetermined location for that eye. The user may then repeat the process for the user's other eye. For ease of description, the following describes calibration of the predetermined location of the user's left eye 402.

With the user 302 viewing the target marker only with the user's left eye 402, the user may move his head until the virtual marker is visually aligned with the real world target 318 at an alignment condition. When the virtual marker 306 is visually aligned with the real world target 318 at the alignment condition, the user 302 may provide a user input indicating the alignment. The user input may comprise a verbal cue, such as the user 302 speaking "Aligned", that is received by the microphone 30 of the HMD 10 and processed by the eye location calibration program 26. In other examples, the user input may comprise a gesture made by the user 302 that is visible by the outward facing image sensor(s) 22. In other examples the user input may comprise the user 302 holding his head stationary for a predetermined period of time such as, for example, 5 seconds. In still other examples, the user input may comprise the user 302 pressing a button on another computing device. It will be appreciated that any other suitable form of user input may also be used.

At the alignment condition, the HMD 10 acquires image data via the outward facing image sensor(s) 22 that includes the real world target 318. Using such image data, the HMD 10 then determines the location of the real world target 318 relative to the HMD. In one example, the image sensor(s) 22 comprise one or more depth cameras that generate image data including depth data that is used to determine the location of the real world target 318. In another example, the image sensor(s) 22 comprise two or more RGB, infrared, grayscale, and/or other cameras that generate image data that is used to determine the location of the real world target 318. In another example where the size of the real world target 318 is known, the HMD 10 may utilize a single camera to determine the location of the real world target 318.

In the example shown in FIG. 3, the real world target 318 is located on poster 314 that is mounted to wall 330. However, the poster 314 may be located or mounted in any suitable manner. Further, in other examples, the poster 314 may comprise a hand-held poster or other calibration surface that is configured to be held by user 302 in front of the HMD 10.

In yet other embodiments, the real-world target may be a background object in a local environment, rather than a dedicated poster or other dedicated target. For example, in some embodiments the real world target may take the form of an edge or surface of an article or feature in the physical environment surrounding the user. As more specific examples and with reference to FIG. 3, the real world target may take the form of a ceiling corner 332, an edge 334 of a table 338, or any other suitable surface or edge. It will be understood that these real world targets are presented for the purpose of example, and are not intended to be limiting in any manner.

Where a background object is used as a real-world alignment target, as opposed to a dedicated target, the background object to be used for alignment may be identified in any suitable manner. For example, in some embodiments, image analysis and/or scene understanding techniques may be used to automatically identify straight lines in a background image (e.g. by edge detection methods, such as by contrast and/or gradient), and depth data (e.g. stereo image data or depth image data) may be used to determine the distance to the real-world target. As another example, plane detection based upon both a two-dimensional image (grayscale or RGB) and a depth map or mesh representation of the background environment may be used to detect alignment targets. The depth information may be used to locate edges, and the edges located may then be compared with an RGB image to help identify objects in the RGB image for use as alignment targets. Surface reconstruction techniques also may be used to locate alignment targets from depth information. Further, multiple depth maps from different angles may be used to provide a richer set of depth information.

Any suitable background object may be used as an alignment target. Suitable objects may include, but are not limited to, objects having detectable vertical and/or horizontal lines (for respectively calibrating horizontal and vertical eye position). Additionally, objects that are stationary, and/or that have a sufficiently large size to obtain good demarcation and to be larger than the noise level in the imaging system, also may be suitable as alignment targets. Additionally, location relative to a user may be considered when selecting a background object as an alignment target. For example, as one non-limiting example, linear objects (or objects with linear characteristics, e.g. rectangular or other polygonal objects with a horizontal and/or vertical linear feature) within 0.9-1.5 meters away and that are resolvable at approximately a user's eye height may be suitable as alignment targets. Further, objects having a sufficient volume of navigable space around them also may be located, such that a user is determined to have a well-located space in which to stand to perform a calibration process. Such space may be identified in any suitable manner, including but not limited to surface reconstruction techniques.

The use of a background object to perform calibration may offer advantages over the use of a dedicated target. For example, a user may calibrate an IPD in any environment in which suitable objects can be located, which may be more convenient than carrying a dedicated target or moving to an environment in which a dedicated target is placed.

Additionally, the use of background objects may allow a previously-determined calibration to be updated at runtime as a background process while a user is executing other experiences on an HMD. This may allow the calibration to be adjusted for temporary changes in IPD that occur during HMD use. For example, if the user is looking at an object close by, the eyes of the user will be directed more inwardly. As such, the IPD of the user may be temporarily smaller than when initially calibrated while the user is gazing at the close object.

Temporary changes in IPD that occur during HMD use may be detected or determined in any suitable manner. For example, in some embodiments, an estimate of where a user is looking may be made based upon physical scene understanding and/or virtual scene understanding, and the estimate may be used to perform an updated calibration. As a more specific example, if it is determined that the user is facing a wall that is located close to the user, it may be assumed that the user is looking at the wall, and the IPD may be updated based upon a distance to the wall. Likewise, if it can be determined that there is an "interesting" object in front of the user, such as a picture, at which the user is likely to look, the IPD calibration may be updated based upon the location of the object of potential interest. Further, in embodiments that comprise eye tracking sensors, eye tracking may be used to determine a direction of the user's gaze of each eye, and to update the IPD calibration accordingly.

The use of a background object as an alignment target (or a dedicated target positioned at a fixed location in a use environment) also may offer advantages over the use of a hand-held dedicated target. For example, such alignment targets may help to avoid vergence accommodation conflicts that may arise if a user holds an alignment target too close to the HMD. Additionally, because such alignment targets are at a fixed position, a user may move relative to the alignment target to acquire additional data points from different perspectives. This may help to reduce an uncertainty in the determined calibration relative to the use of a hand-held target. Further, additional data points also may facilitate the determination of a depth distance between the user's eye and the display of the HMD. In other embodiments, this distance may be estimated or pre-set based, for example, upon system design and assumed user anatomy.

Upon locating a suitable object, the HMD may notify a user of the identity of the object in any suitable manner. For example, the HMD may visually highlight an area around the object, display pointers to the object, etc.

In some instances, ambiguities may arise regarding whether a user looked at a correct background alignment target. As a more specific example, if an alignment target comprises a selected stripe of a wall covered in striped wallpaper, it may be unclear whether the user looked at the correct stripe during calibration. Such ambiguities may be avoided prospectively and/or resolved retrospectively. For example, when identifying potential alignment targets, potential alignment targets located sufficiently close to other potential alignment targets for such ambiguity to occur may be rejected as alignment targets. Likewise, if a user uses the wrong object to perform calibration, the location at which the user was actually looking may be determined, and the object at that location then may be used as a calibration target in a calibration process.

With reference to FIG. 4, it will be appreciated that at the alignment condition the real world target 318 and virtual marker 306 are approximately collinear with the center of the user's left eye 402. Thus, using the acquired image data the eye location calibration program 26 may determine and generate a plane 326 that extends in the Y and Z directions and passes through the real world target 318, the virtual marker 306 and the approximate center of the user's left eye 402. Using the known locations of the real world target 318 and virtual marker 306, as well as an estimated eye relief distance 434, an estimated left eye location 438 relative to a fixed location 414 on the HMD 10 may be determined. Example methods for performing this determination are described below.

With continued reference to FIG. 4, in some examples the estimated center 450 between the left eye predetermined location 410 and the right eye predetermined location 418 may be determined using a predetermined IPD. A ray 458 may be projected that extends from the estimated center 450 toward the left eye predetermined location 410. The point at which the ray 458 intersects the plane 326 may then be determined as the estimated left eye location 438. Additionally, the distance between the estimated center 450 and the estimated left eye location 438 may be added to the distance between the estimated center 450 and the estimated right eye location 454, determined in a similar manner, to yield an estimated IPD between the user's left eye 402 and right eye 406.

In some examples, the estimated left eye location 438 may be spaced from the left eye predetermined location 410 by a horizontal offset 442. In this example, the left eye predetermined location 410 may be calibrated by subtracting the horizontal offset 442 from the predetermined left eye location.

It will be appreciated that the above-described examples of determining and using an estimated left eye location 438 to calibrate a left eye predetermined location 410 may be utilized with respect to the user's right eye 406 to calibrate the right eye predetermined location 418. Additionally, one or both of the left eye predetermined location 410 and right eye predetermined location 418 may be calibrated a plurality of times to refine one or both such locations. Further, in some examples a motion sensor 50 of the HMD 10 may determine whether the HMD is in motion at the alignment condition when image data of the real world target is captured. Where the HMD is in motion, the image data may be weighted less or otherwise adjusted in determining the estimated eye location. In some examples where the magnitude of the motion exceeds a predetermined threshold, the corresponding image data may be discarded and the user may be instructed to align the virtual marker again.

Figure 5:
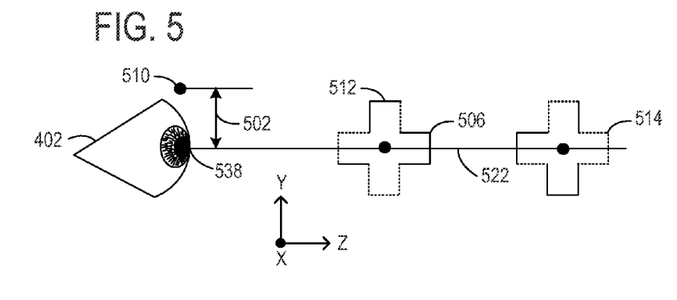
FIG. 5 shows a schematic view of an example embodiment of a virtual marker and a real world target aligned with an eye.

In other examples and with reference now to FIG. 5, a vertical offset 502 of a left eye predetermined location 510 relative to an estimated left eye location 538 may also be determined in a manner similar to determining the horizontal offset 442. In these examples, the user 302 may align another embodiment of a virtual marker 506 comprising at least one horizontal line 512 with another embodiment of a real world target 514. In the example shown in FIG. 5, the virtual marker 506 and real world target 514 each comprise a cross shape that includes horizontal and vertical solid lines and dashed lines. For ease of illustration, it will be appreciated that the virtual marker 506 and real world target 514 are shown rotated 90 degrees.

It will also be appreciated that the solid lines of the virtual marker 506 correspond to dashed lines on the real world target 514, and the dashed lines of the virtual marker 506 correspond to solid lines on the real world target 514. Advantageously, this configuration of solid and dashed lines may facilitate and simplify the process of visually aligning the virtual marker 506 and real world target 514, as a visual overlap condition may be more easily identified by a user. It will also be appreciated that in other examples a virtual marker may include one or more solid lines, one or more dashed lines, one or more solid lines and one or more dashed lines, and/or any other suitable feature or combination of features.

With continued reference to FIG. 5 and in another example, a ray 522 that extends in the Z direction and passes through a center of the second real world target 514, the center of the second virtual marker 506 and the center of the user's left eye 402 may be determined and generated. Using the known locations of the second real world target 514 and second virtual marker 506, as well as an estimated eye relief distance, an estimated left eye location 538 along the Y axis may be determined.

In other examples, one or more of the above-described examples may be combined with a password login process. For example, prior to performing a series of eye movements and/or dwells for a password login process, a user may align a virtual marker with a real world target as described above. The user may then visually interact with a virtual keyboard displayed by the HMD 10 to type in a password by directing the user's gaze along virtual keyboard keys in a selected order.

In another example, after aligning the virtual marker and real world target the user may enter a password by drawing a shape or other design via gaze movements. In yet another example, a plurality of real world targets may be available for the user to choose from. The user may align the virtual marker with the real world targets in a particular order to enter the user's password, and in the process the system may collect image data for calibrating a predetermined eye location. It will be appreciated that in each of these examples, an eye location calibration process similar to the process described above may occur in the background during the password login process without the user being aware of the calibration process.

Figure 6:
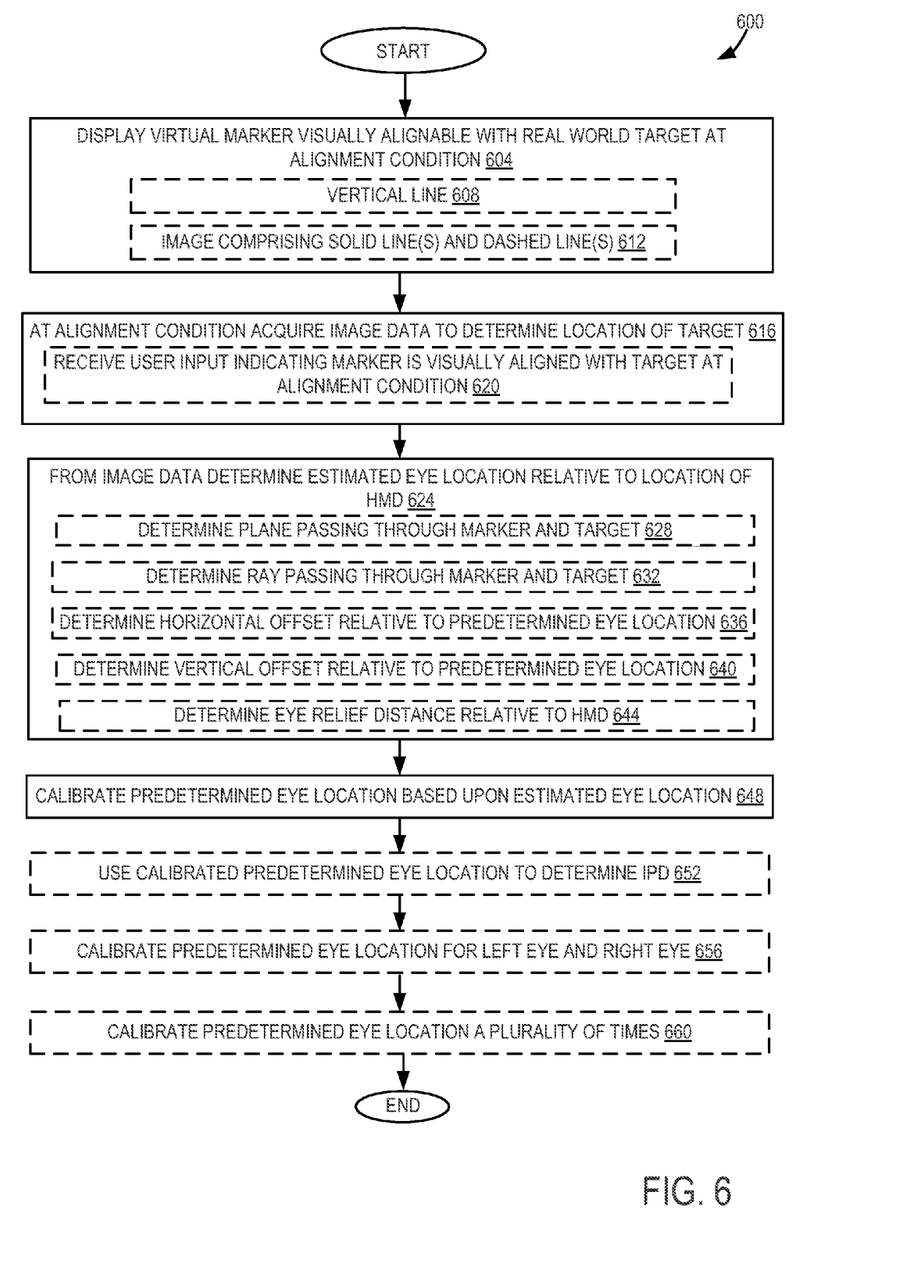
FIG. 6 shows a flow diagram depicting an example embodiment of a method for calibrating a predetermined eye location.

FIG. 6 illustrates a flow chart of a method 600 of calibrating a predetermined eye location according to an embodiment of the present disclosure. The following description of method 600 is provided with reference to the software and hardware components of the HMD 10 and eye location calibration program 26 described above and shown in FIGS. 1 and 2. It will be appreciated that method 600 may also be performed in other contexts using other suitable hardware and software components.

Accordingly, in one example at 604 the method 600 includes displaying a virtual marker that is visually alignable with a real world target at an alignment condition. At 608 and in one example, the real world target may comprise a vertical line. In another example, at 612 the real world target may comprise an image comprising one or more solid lines and one or more dashed lines.

At 616 the method 600 includes, at the alignment condition, acquiring image data to determine the location of the real world target. At 620, the method 600 may also include receiving user input indicating that the virtual marker is visually aligned with the real world target at the alignment condition. At 624 the method 600 includes determining from the image data an estimated eye location relative to the location of the HMD 10. In one example, at 628 the method 600 may include determining a plane that passes through the virtual marker and the real world target. In another example, at 632 the method 600 may include determining a ray that passes through the virtual marker and the real world target.

At 636 the method 600 may include determining a horizontal offset relative to a predetermined eye location. At 640 the method 600 may further include determining a vertical offset relative to a predetermined eye location. At 644 the method 600 may also include determining an eye relief distance relative to the HMD 10.

At 648 the method 600 includes calibrating the predetermined eye location based upon the estimated eye location. At 652 the method 600 may include using the calibrated predetermined eye location to determine an IPD. At 656 the method 600 may include calibrating a predetermined eye location for a left eye, and calibrating a predetermined eye location for a right eye. At 660 the method 600 may include calibrating a predetermined eye location a plurality of times.

Figure 7:
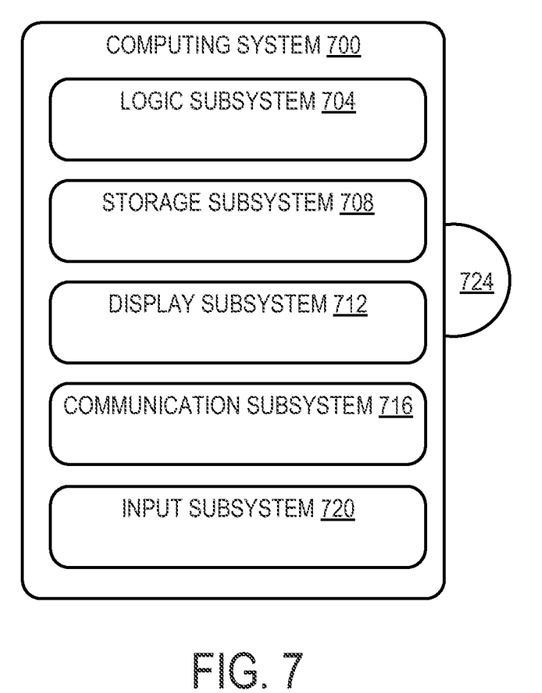
FIG. 7 shows a block diagram of an example embodiment of a computing system.

It will be appreciated that the methods described above may be performed via any suitable computing device configured to display a virtual marker, including but not limited to HMD 10. FIG. 7 schematically shows a non-limiting embodiment of a computing system 700 that may perform one or more of the above described methods and processes. Computing system 700 is shown in simplified form. It is to be understood that virtually any computer architecture may be used without departing from the scope of this disclosure. In different embodiments, computing system 700 may take the form of computing device 38 integrated in HMD 10, a mainframe computer, server computer, desktop computer, laptop computer, tablet computer, home entertainment computer, network computing device, mobile computing device, mobile communication device, gaming device, etc.

As shown in FIG. 7, computing system 700 includes a logic subsystem 704 and a storage subsystem 708. Computing system 700 may optionally include a display subsystem 712, a communication subsystem 716, an input subsystem 720, and/or other subsystems and components not shown in FIG. 7. Computing system 700 may also include computer readable media, with the computer readable media including computer readable storage media and computer readable communication media. Computing system 700 may also optionally include other user input devices such as keyboards, mice, game controllers, and/or touch screens, for example. Further, in some embodiments the methods and processes described herein may be implemented as a computer application, computer service, computer API, computer library, and/or other computer program product in a computing system that includes one or more computers.

Logic subsystem 704 may include one or more physical devices configured to execute one or more instructions. For example, the logic subsystem 704 may be configured to execute one or more instructions that are part of one or more applications, services, programs, routines, libraries, objects, components, data structures, or other logical constructs. Such instructions may be implemented to perform a task, implement a data type, transform the state of one or more devices, or otherwise arrive at a desired result.

The logic subsystem 704 may include one or more processors that are configured to execute software instructions. Additionally or alternatively, the logic subsystem may include one or more hardware or firmware logic machines configured to execute hardware or firmware instructions. Processors of the logic subsystem may be single core or multi-core, and the programs executed thereon may be configured for parallel or distributed processing. The logic subsystem may optionally include individual components that are distributed throughout two or more devices, which may be remotely located and/or configured for coordinated processing. One or more aspects of the logic subsystem may be virtualized and executed by remotely accessible networked computing devices configured in a cloud computing configuration.

Storage subsystem 708 may include one or more physical, persistent devices configured to hold data and/or instructions executable by the logic subsystem 704 to implement the herein described methods and processes. When such methods and processes are implemented, the state of storage subsystem 708 may be transformed (e.g., to hold different data).

Storage subsystem 708 may include removable media and/or built-in devices. Storage subsystem 708 may include optical memory devices (e.g., CD, DVD, HD DVD, Blu-ray Disc, etc.), semiconductor memory devices (e.g., RAM, EPROM, EEPROM, etc.) and/or magnetic memory devices (e.g., hard disk drive, floppy disk drive, tape drive, MRAM, etc.), among others. Storage subsystem 708 may include devices with one or more of the following characteristics: volatile, nonvolatile, dynamic, static, read/write, read-only, random access, sequential access, location addressable, file addressable, and content addressable.

In some embodiments, aspects of logic subsystem 704 and storage subsystem 708 may be integrated into one or more common devices through which the functionally described herein may be enacted, at least in part. Such hardware-logic components may include field-programmable gate arrays (FPGAs), program- and application-specific integrated circuits (PASIC/ASICs), program- and application-specific standard products (PSSP/ASSPs), system-on-a-chip (SOC) systems, and complex programmable logic devices (CPLDs), for example.

FIG. 7 also shows an aspect of the storage subsystem 708 in the form of removable computer readable storage media 724, which may be used to store data and/or instructions executable to implement the methods and processes described herein. Removable computer-readable storage media 724 may take the form of CDs, DVDs, HD DVDs, Blu-Ray Discs, EEPROMs, and/or floppy disks, among others.

It is to be appreciated that storage subsystem 708 includes one or more physical, persistent devices, and excludes propagating signals per se. In contrast, in some embodiments aspects of the instructions described herein may be propagated by a pure signal (e.g., an electromagnetic signal, an optical signal, etc.) via a transmission medium. Furthermore, data and/or other forms of information pertaining to the present disclosure may be propagated by a pure signal via a transmission medium.

When included, display subsystem 712 may be used to present a visual representation of data held by storage subsystem 708. As the above described methods and processes change the data held by the storage subsystem 708, and thus transform the state of the storage subsystem, the state of the display subsystem 712 may likewise be transformed to visually represent changes in the underlying data. The display subsystem 712 may include one or more display devices utilizing virtually any type of technology. Such display devices may be combined with logic subsystem 704 and/or storage subsystem 708 in a shared enclosure, or such display devices may be peripheral display devices.

When included, communication subsystem 716 may be configured to communicatively couple computing system 700 with one or more networks and/or one or more other computing devices. Communication subsystem 716 may include wired and/or wireless communication devices compatible with one or more different communication protocols. As nonlimiting examples, the communication subsystem 716 may be configured for communication via a wireless telephone network, a wireless local area network, a wired local area network, a wireless wide area network, a wired wide area network, etc. In some embodiments, the communication subsystem may allow computing system 700 to send and/or receive messages to and/or from other devices via a network such as the Internet.

When included, input subsystem 720 may comprise or interface with one or more user-input devices such as a keyboard, mouse, microphone, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

The term "program" may be used to describe an aspect of the present disclosure that is implemented to perform one or more particular functions. In some cases, such a program may be instantiated via logic subsystem 704 executing instructions held by storage subsystem 708. It is to be understood that different programs may be instantiated from the same application, service, code block, object, library, routine, API, function, etc. Likewise, the same program may be instantiated by different applications, services, code blocks, objects, routines, APIs, functions, etc. The term "program" is meant to encompass individual or groups of executable files, data files, libraries, drivers, scripts, database records, etc.

It will be understood that the configurations and/or approaches described herein are presented for the purpose of example, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. In a head-mounted display, a method of calibrating a predetermined eye location, the method comprising:
   displaying a virtual marker visually alignable with a real world target at an alignment condition;
   at the alignment condition, acquiring image data to determine a location of the real world target;
   from the image data, determining an estimated eye location relative to a location of the head-mounted display; and
   calibrating the predetermined eye location based upon the estimated eye location.

2. The method of claim 1, wherein determining an estimated eye location further comprises determining a plane that passes through the virtual marker and the real world target.

3. The method of claim 1, wherein determining an estimated eye location further comprises determining a ray that passes through the virtual marker and the real world target.

4. The method of claim 1, further comprising receiving a user input indicating when the virtual marker is visually aligned with the real world target at the alignment condition.

5. The method of claim 1, wherein determining an estimated eye location further comprises determining one or more of a horizontal offset relative to the predetermined eye location, a vertical offset relative to the predetermined eye location, and an eye relief distance relative to the head-mounted display.

6. The method of claim 1, wherein the calibration is performed as a background process during use of the head-mounted display.

7. The method of claim 1, further comprising calibrating the predetermined eye location a plurality of times to refine the predetermined eye location.

8. The method of claim 1, further comprising using the calibrated predetermined eye location to determine an inter-pupillary distance.

9. The method of claim 1, wherein the virtual marker comprises one or more of a vertical line, a horizontal line, a solid line, and a dashed line.

10. A computing device comprising:
    a logic subsystem; and
    a data-holding subsystem comprising instructions stored thereon that are executable by the logic subsystem to:
       via a head-mounted display, display a virtual marker to be visually aligned with a real world target at an alignment condition;
       at the alignment condition, acquire image data from the head-mounted display to determine a location of the real world target;
       using the image data, determine an estimated eye location relative to a location of the head-mounted display; and
       calibrate a predetermined eye location based upon the estimated eye location.

11. The computing device of claim 10, wherein the computing device comprises the head-mounted display.

12. The computing device of claim 10, wherein the instructions are further executable to determine one or more of a horizontal offset relative to the predetermined eye location, a vertical offset relative to the predetermined eye location, and an eye relief distance relative to the head-mounted display.

13. The computing device of claim 10, wherein the instructions are further executable to:
calibrate the predetermined eye location for a left eye, and calibrate the predetermined eye location for a right eye.

14. The computing device of claim 10, wherein the instructions are further executable to receive a user input indicating when the virtual marker is visually aligned with the real world target at the alignment condition.

15. The computing device of claim 10, wherein the instructions are further executable to display the virtual marker and acquire image data from the head-mounted display at the alignment condition as a part of a password entry process to determine a location of the real world target.

16. The computing device of claim 10, wherein the instructions are further executable to use the calibrated predetermined eye location to determine an interpupillary distance.

17. A head-mounted display, comprising:
an image sensor; and
an eye location calibration program executed by a processor of the head-mounted display, the eye location calibration program configured to:
display a virtual marker visually alignable with a real world target at an alignment condition;
at the alignment condition, acquire image data from the image sensor to determine a location of the real world target;
using the image data, determine a plane that passes through the virtual marker and the real world target;
using the plane, determine an estimated eye location relative to a location of the head-mounted display; and
calibrate a predetermined eye location based upon the estimated eye location.

18. The head-mounted display of claim 17, wherein the eye location calibration program is further configured to determine one or more of a horizontal offset relative to the predetermined eye location, a vertical offset relative to the predetermined eye location, and an eye relief distance relative to the head-mounted display.

19. The head-mounted display of claim 17, wherein the eye location calibration program is further configured to receive a user input indicating when the virtual marker is visually aligned with the real world target at the alignment condition.

20. The head-mounted display of claim 17, wherein the eye location calibration program is further configured to:
calibrate the predetermined eye location for a left eye; and
calibrate the predetermined eye location for a right eye.

* * * * *